Sept. 3, 1935. F. G. FREESE Re. 19,688

RADIOCONDENSER

Original Filed Feb. 6, 1925

Frank G. Freese
INVENTOR

BY Victor J. Evans
ATTORNEY

J. Bahr, Jr.
WITNESS:

Reissued Sept. 3, 1935 Re. 19,688

UNITED STATES PATENT OFFICE 19,688

RADIOCONDENSER

Frank G. Freese, Aldan, Pa., assignor to Radio Condenser Company, Camden, N. J.

Original No. 1,597,591, dated August 24, 1926, Serial No. 7,384, February 6, 1925. Application for reissue February 4, 1931, Serial No. 513,403

4 Claims. (Cl. 175—41.5)

This invention relates to condensers as designed for use in radio receiving sets, and an object of the invention is to provide a condenser having a plurality of movable plates embodied in its rotor and a plurality of stationary plates in its stator as in various approved types of condensers and in which either the plates of the rotor or stator are honeycombed or provided with a plurality of openings for reducing a capacity of the condenser and permitting more accurate adjustment thereof for the purpose of tuning in radio stations of different wave lengths.

In the present form of radio condensers of this type wherein the plates of both the rotor and the stator are both solid, I have found that when the same are used on certain receiving sets with the usual dial structures, only about a quarter of the graduations of the dials are utilized in tuning in the stations, and by reducing the metallic area of the plates of the condenser, particularly at the high frequency end, the tuning adjustment of the dial, if a single dial be used, is increased, permitting more accurate adjustment of the plates, and consequently finer tuning in on the broadcasting stations in that it varies the distance between the graduations on the dial corresponding to the differences in the wave lengths.

Further objects of the invention are, that by perforating or honeycombing the plates of the condenser, the stations of different wave lengths are brought in by more gradual adjustment of the condenser plates which enables the operator to obtain a finer and more accurate tuning of the set, also providing greater selectiveness to the set and resulting in clearer signals of relatively greater volume.

Other objects of the invention will appear in the following detail description, and in the accompanying drawing wherein.

Figure 1:
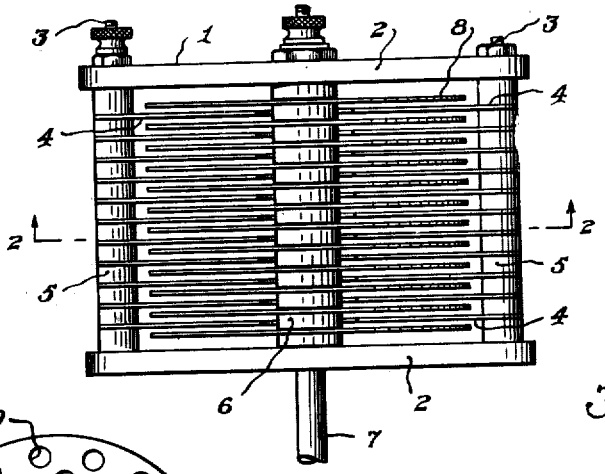
Figure 1 is a plan view of a condenser constructed in accordance with this invention.

Referring more particularly to the drawing, the improved condenser comprises the stator 1 which is composed of suitable end plates 2, carrying rods 3 and a plurality of stationary metal plates 4 which are formed of any suitable metal and are held in spaced relation one to the other by means of suitable washers 5. The condenser includes the rotor 6 embodying the central shaft 7 which is rotatably carried by the plates 2 and carries the rotor condenser plates 8 which are also formed of any suitable metal and alternate with the stator plates 4.

Figure 5:
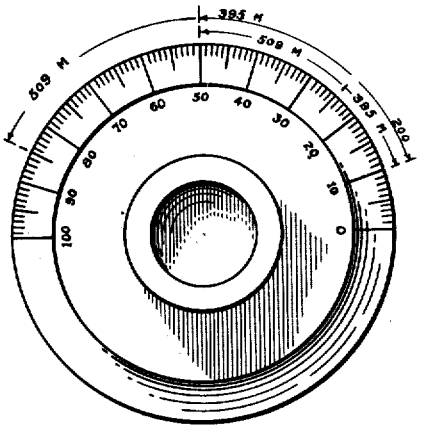
Figure 5 is a view of a dial, such as used in connection with the condenser and shown in the present drawing for the purpose of bringing out more advantageously the operation of the improved condenser.

In one form of the invention, the rotor plates 8 are honeycombed or provided with a plurality of perforations 9 which while decreasing their metal area and consequently decreasing the capacity of the condenser, also bring about a redistribution of the plate area and thereby varies the tuning range of the condenser over one in which the plates of the rotor are solid; for example:

Referring to the dial shown in Figure 5 of the drawing, I have found by practical demonstration or experiment that on a condenser where the plates are solid, adustment form 200 meters to 509 meters occurred on the dial from graduations 10 to 50, thereby bunching all of the broadcasting stations of intermediate wave lengths in a relatively small space on the dial and condenser which resulted in considerable difficulty in properly tuning in stations where only a small meter difference exists between the wave lengths and frequently causing confusion of one station with another, while with the perforated or honeycombed rotor plates, the tuning of the stations from 200 to 509 meters varied between the graduations 10 and 85, practically doubling the adjustment necessary of the condenser to properly tune in the respective stations and consequently permitting more selective and accurate tuning of the radio receiving set.

Figure 2:
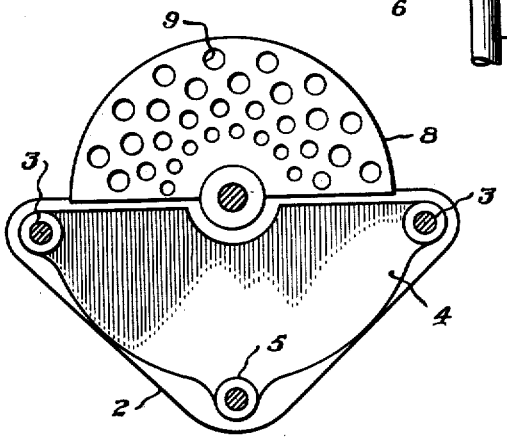
Figure 2 is a section through the condenser taken on the line 2—2 of Figure 1.

As will be noted by reference to Figure 2 of the drawing, no two of the perforations 9 have their centers on a true radius scribed from the axis of rotation of the rotatable plates, thereby providing for gradual increasing of the metallic portion of the plate, as it is moved between the stationary plates.

Figure 3:
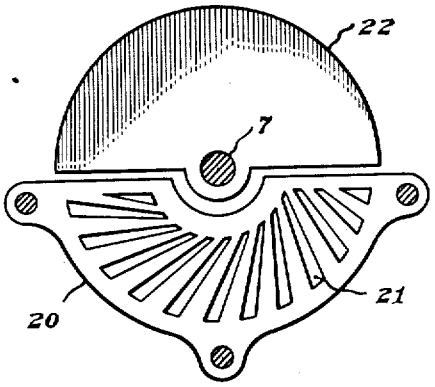
Figure 3 is a view of a modified form of the invention showing the rotor plate solid and the stator plates perforated.

In Figure 3 of the drawing, a modified form of the invention is shown in which the stator plates 20 are provided with a plurality of perforations 21. These perforations 21 are shown as tangential slots but it is to be understood that they may be of any suitable type or shape of perforation without departing from the spirit of this invention, and in the condenser structure embodying the perforated stator plates 20 the rotor plates 22 are solid or free from perforations.

Figure 4:
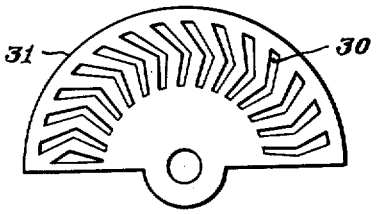
Figure 4 is a detail view of one of the rotor plates showing a modified form of perforation.

In Figure 4 of the drawing, a modified form of the perforated rotor plate is shown in which the perforations 30 are substantially V-shaped with the lines of conjunction of their angled portions all positioned on an arc scribed from the axis of rotation of the plate 31. The particular arrangement of these openings permits gradual variation of the capacity of the condenser owing to the substantially V-shape of the metallic portions of the plate between the respective slots, the metallic portion being V-shaped, permits very gradual adjustment of the relative metallic portions of the movable or rotary plates.

It is, of course, to be understood, that the invention may be constructed in various other manners and the parts associated in different relations, and therefore, I do not desire to be limited in any manner, except as set forth in the claims hereunto appended.

Having thus described my invention, what I claim is:

1. In a variable condenser for radio receiving sets, a stator including a plurality of stationary plates, said plates perforated with a plurality of tangential slots, said slots positioned on an arc scribed from the axis of said stator, a rotor including a plurality of semi-circular rotatable plates, said rotatable plates provided with a plurality of spaced apertures, and said apertures positioned on a series of arcs scribed from the axis of said rotor and diminishing in diameter as they extend inwardly towards the axis of said rotor.

2. In a variable condenser for radio receiving sets, a stator including a plurality of stationary plates, said plates perforated with a plurality of tangential slots, said slots positioned on an arc scribed from the axis of said stator, a rotor including a plurality of semi-circular rotatable plates, said rotatable plates provided with a plurality of substantially V-shaped slots with the lines of conjunction of their angle portions all positioned on an arc scribed from the axis of said rotor, and said tangential and V-shaped slots adapted for decreasing metallic area of the said variable condenser independently.

3. In an electrical condenser having sets of relatively movable plates, a stator including a plurality of stationary plates, a rotor including a plurality of rotatable plates, at least one set of said plates being provided with a plurality of perforations distributed over the area of the plates of the set whereby no two of the perforations will align arcuately on radii struck from the axis of rotation of the rotor.

4. In an electrical condenser for use in radio circuits, sets of opposed plates relatively movable one with respect to the other; means for securing separation of radio stations particularly at the high frequency end of the broadcast wave band comprising; perforations adjacently arranged in the plates of at least one set of said sets of opposed plates, said perforations being so arranged that no two of them will align arcuately on radii struck from the axis of said set of plates.

FRANK G. FREESE.